US011151682B2

(12) United States Patent
Khalid et al.

(10) Patent No.: US 11,151,682 B2
(45) Date of Patent: Oct. 19, 2021

(54) SYSTEM AND METHODS FOR DISTRIBUTED GPU USING MULTI-ACCESS EDGE COMPUTE SERVICES

(71) Applicant: Verizon Patent and Licensing Inc., Arlington, VA (US)

(72) Inventors: Mohammad Raheel Khalid, Budd Lake, NJ (US); William Patrick Dildine, Hoboken, NJ (US); Richard Christopher Lamb, Renton, WA (US); Vinaya Kumar Polavarapu, Irving, TX (US); Paul Duree, Livermore, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/518,083

(22) Filed: Jul. 22, 2019

(65) Prior Publication Data

US 2021/0027415 A1 Jan. 28, 2021

(51) Int. Cl.
*G06T 1/20* (2006.01)
*G06F 9/455* (2018.01)
(Continued)

(52) U.S. Cl.
CPC ............. *G06T 1/20* (2013.01); *G06F 9/3891* (2013.01); *G06F 9/45558* (2013.01);
(Continued)

(58) Field of Classification Search
CPC ................ G06T 1/20; G06F 9/44–548; G06F 2009/45562; G06F 2009/4557;
(Continued)

(56) References Cited

U.S. PATENT DOCUMENTS

2011/0185064 A1* 7/2011 Head ................... G06F 9/5088
709/226
2012/0005685 A1* 1/2012 Chen .................... G06F 9/5072
718/104

(Continued)

OTHER PUBLICATIONS

Amazon, "Amazon Elastic Compute Cloud API Reference", Nov. 15, 2016, p. 164 (Year: 2016).*

(Continued)

*Primary Examiner* — Diane M Wills

(57) ABSTRACT

Systems and methods provide a provisioning framework for a distributed graphics processing unit (GPU) service. A network device in a network receives, from an application, a service request for multi-access edge compute (MEC)-based virtual graphic processing unit (vGPU) services. The network device receives real-time utilization data from multiple MEC clusters in different MEC network locations and generates a utilization view of the multiple MEC clusters in the different MEC network locations. The network device selects, based on the real-time utilization view, one of the different MEC network locations to provide the vGPU services and instructs a of the multiple MEC clusters in the one of the different MEC network locations to perform container provisioning and service provisioning for the vGPU services.

20 Claims, 8 Drawing Sheets

(51) Int. Cl.
*G06F 9/38* (2018.01)
*G06N 20/00* (2019.01)
*H04L 29/06* (2006.01)

(52) U.S. Cl.
CPC ............. *G06N 20/00* (2019.01); *H04L 63/08* (2013.01); *G06F 2009/4557* (2013.01); *G06F 2009/45587* (2013.01); *G06F 2009/45595* (2013.01)

(58) Field of Classification Search
CPC . G06F 2009/45575; G06F 2009/45587; G06F 2009/45595; G06N 20/00; H04L 63/08
See application file for complete search history.

(56) References Cited

U.S. PATENT DOCUMENTS

| | | | |
|---|---|---|---|
| 2017/0230451 A1* | 8/2017 | Paramasivam | H04L 67/22 |
| 2018/0150240 A1* | 5/2018 | Bernat | G06F 3/0647 |
| 2020/0026575 A1* | 1/2020 | Guim Bernat | G06F 9/5044 |
| 2020/0073670 A1* | 3/2020 | Alexander | G06F 9/3857 |
| 2020/0133702 A1* | 4/2020 | Sharma | G06F 9/505 |
| 2020/0183747 A1* | 6/2020 | Kishan | G06F 9/5005 |
| 2020/0233715 A1* | 7/2020 | Kottapalli | G06F 9/5027 |

OTHER PUBLICATIONS

Satyanarayanan , "The Emergence of Edge Computing", Computer, IEEE Computer Society, 2017 (Year: 2017).*

* cited by examiner

SYSTEM AND METHODS FOR DISTRIBUTED GPU USING MULTI-ACCESS EDGE COMPUTE SERVICES

BACKGROUND

One enhancement made possible through new broadband cellular networks is the use of Multi-access Edge Compute (MEC) platforms (also referred to as Mobile Edge Compute platforms). The MEC platforms allow high network computing loads to be transferred onto edge servers. Depending on the location of the edge servers relative to the point of attachment (e.g., a wireless station for an end device), MEC platforms can provide various services and applications to user devices with minimal latency. MEC platforms may use central processing units (CPUs) with virtual machines that may be scaled and reallocated to provide different services to end devices. Unlike CPUs, the use of graphics processing units (GPUs) in a MEC platform may present different challenges.

DETAILED DESCRIPTION OF PREFERRED EMBODIMENTS

Figure 1:
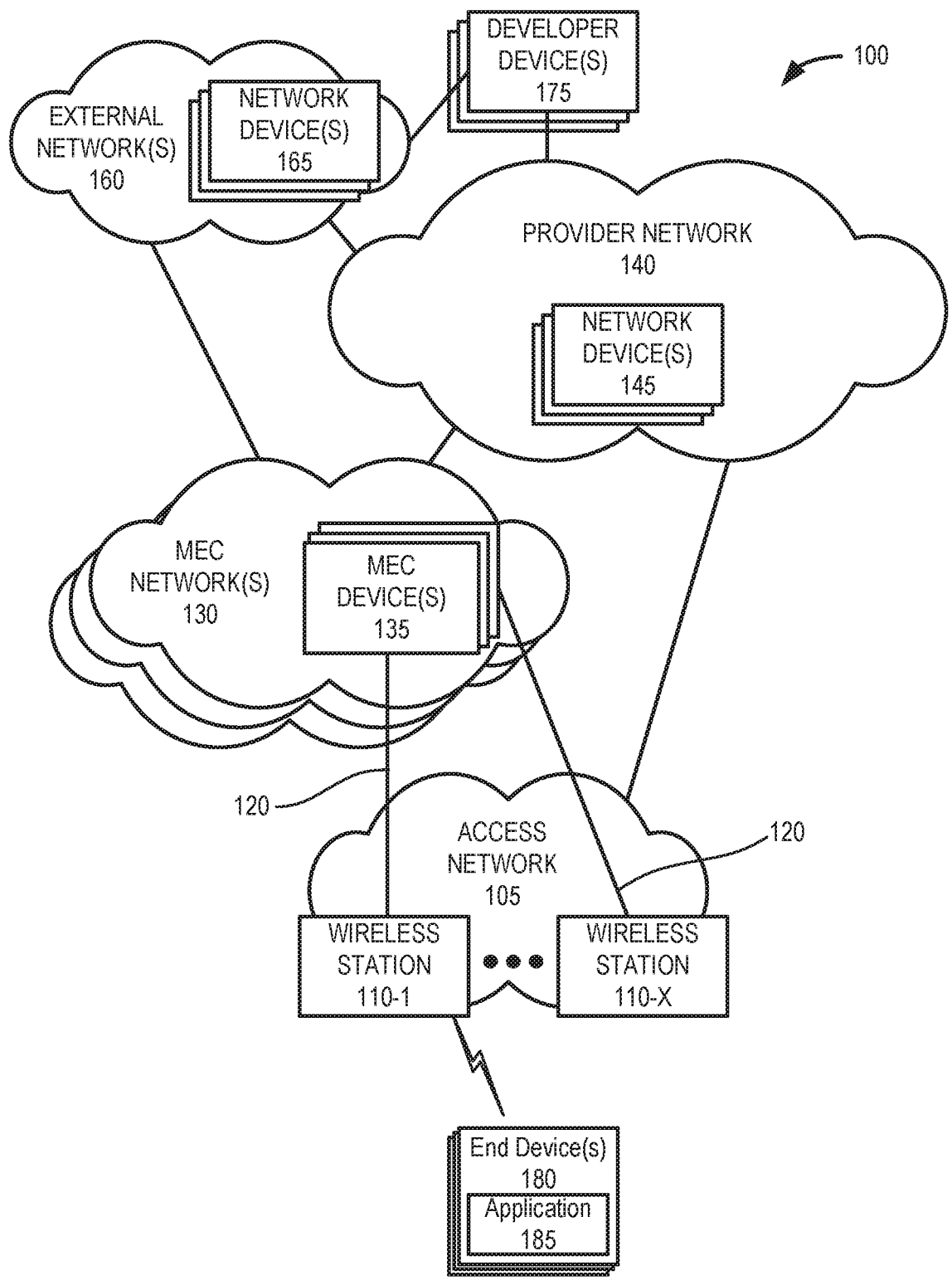
FIG. 1 is a diagram illustrating an exemplary network environment in which a distributed GPU service described herein may be implemented.

The following detailed description refers to the accompanying drawings. The same reference numbers in different drawings may identify the same or similar elements. Also, the following detailed description does not limit the invention.

Graphics cards or graphics processing units (GPUs) included with most mobile devices tend to have limited capabilities due to, for example, limited space and power constraints. High-end GPUs (e.g., with capabilities that extend beyond most mobile devices) are important for supporting immersive technologies, such as virtual reality, augmented reality, and mixed reality (referred to collectively as "XR"), and other graphic-intensive applications.

Customer applications (or "apps") running on user's end devices can take advantage of MEC compute resources to provide enhanced services. For example, an application may offload compute tasks to a MEC platform that can provide services faster than other cloud-based services or a local processor in the end device. Currently, MEC resources are limited and inherently targeted to certain use cases that are latency sensitive and compute resource intensive. These use cases typically include scenarios that benefit greatly from GPUs, such as XR applications. However, MEC platforms have historically been constructed under a CPU-based model.

Providing GPU services through a MEC platform can provide improved graphics and video performance for users of mobile devices. But the nature of GPUs presents challenges for scaling available resources and sharing GPUs across a large number of users. For example, in contrast with a central processing unit (CPU), a GPU is highly optimized to perform advanced calculations on large volumes of data using parallel computing cores. As a result, resources for remote GPU services tend to be conservatively allocated to ensure customer demands are met. For example, a shared graphics card on a MEC platform typically might support no more than three users. However, such conservative allocation provides inefficient use of MEC provider resources and is not an effective use of resources for the customer.

Generally, cloud-based services offer sufficiently fast data transfer for most customer applications. MEC-based services are generally more resource intensive and suited for use cases where real-time reactions (e.g., less than about 20 milliseconds, preferably less than about 13 milliseconds) are needed by the end device. Particular end device applications that may benefit from MEC-based services include certain support services for XR (e.g., rendering, lighting, spatial audio, vision, etc.), transcoding, drones, real time gaming application, and autonomous driving, where actions/responses are needed within small time windows (e.g., about a 20 millisecond window). Conversely, non-real-time applications (e.g., greater than about 40 milliseconds) may be more effectively serviced via a cloud-based platform or a local processor on the end device.

MEC virtualization has been used to provide computing for immersive technologies. Using MEC virtualization, a virtual system is set up on the MEC which executes an application and provides services to an end device that functions as a thin client. The MEC virtualization system may receive, for example, video frames from the end device, process/render/encode graphics, and return encoded video to the end device for decoding and presentation. However, MEC virtualization uses limited and expensive MEC resources indiscriminately and has an inherent lag. MEC virtualization also lacks a graceful fallback. In other words, when a connection between the MEC and the end device is interrupted, the application cannot function.

According to implementations described herein a distributed GPU service utilizes a combination of MEC GPU resources and end device resources. Using a set of provider APIs, customers (e.g., application providers and developers) may configure their applications to set up an application data pipe for MEC GPU services and to perform other local GPU functions in parallel. The distributed GPU service may separate GPU processes for an application input loop (e.g., a video/audio feed). High compute functions may be performed by MEC clusters and lower compute functions may be performed on a local device (or cloud). Data from the MEC cluster and end device may be blended for presentation to a user. In the event MEC connectivity is interrupted, the system may gracefully fallback to a lower quality presentation using, for example, local processing by the end device. In other implementations, the distributed GPU service described herein may provide complete GPU functionality for an application and/or end device.

Effective execution of a distributed GPU service may require rapid provisioning of virtual GPU resources on different MEC platforms. Systems and methods described herein provide a provisioning framework for a distributed GPU service. A network device in a cloud network may receive, from an application, a service request for MEC-based virtual graphic processing unit (vGPU) services. The network device receives real-time utilization data from multiple MEC clusters in different MEC network locations and generates a utilization view of the multiple MEC clusters in the different MEC network locations. The network device selects a MEC cluster, from the multiple MEC clusters, to provide the vGPU services and instructs the MEC cluster to perform container provisioning and service provisioning for the vGPU services.

FIG. 1 illustrates an exemplary environment 100 in which an embodiment of the distributed GPU service may be implemented. As illustrated, environment 100 includes an access network 105, one or more local MEC networks 130, a provider network 140, and one or more external networks 160. Access network 105 may include wireless stations 110-1 through 110-X (referred to collectively as wireless stations 110 and generally as wireless station 110). Each MEC network 130 may include MEC devices 135; provider network 140 may include network devices 145; and external network 160 may include network devices 165. Environment 100 further includes one or more developer devices 175 and end devices 180.

The number, the type, and the arrangement of network device and the number of user devices 180 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the networks, between the network devices, and between user devices 180 and the network devices. Environment 100 may be implemented to include wired, optical, and/or wireless communication links among the network devices and the networks illustrated. A communication link may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fifth Generation (5G) radio access network (RAN), Fourth Generation (4G) RAN, and/or another type of future generation RAN. By way of further example, access network 105 may be implemented to include an Evolved UMTS Terrestrial Radio Access Network (E-UTRAN) of a Long Term Evolution (LTE)network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or provider network 140.

Depending on the implementation, access network 105 may include one or multiple types of wireless stations 110. For example, wireless station 110 may include a next generation Node B (gNB), an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node. Wireless stations 110 may connect to MEC network 130 via backhaul links 120. According to various embodiments, access network 105 may be implemented according to various wireless technologies (e.g., radio access technology (RAT), etc.), wireless standards, wireless frequencies/bands, and so forth.

MEC network 130 may include an end device application or service layer network (also referred to as an "application service layer network"). According to an implementation, MEC network 130 includes a platform that provides application services at the edge of a network. MEC networks 130 may be located to provide geographic proximity to various groups of wireless stations 110. In some instances, MEC devices 135 may be co-located within a wireless station 110. In other instances MEC devices 135 may be co-located with network devices 145 of provider network 140.

MEC network 130 may be implemented using one or multiple technologies including, for example, network function virtualization (NFV), software defined networking (SDN), cloud computing, or another type of network technology. Depending on the implementation, MEC network 130 may include, for example, virtualized network functions (VNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.). MEC network 130 is described further, for example, in connection with FIG. 3.

Provider network 140 may include one or multiple networks of one or multiple network types and technologies to support access network 105. For example, provider network 140 may be implemented to include a next generation core (NGC) network for a 5G network, an Evolved Packet Core (EPC) of an LTE network, an LTE-A network, an LTE-A Pro network, and/or a legacy core network. Depending on the implementation, provider network 140 may include various network devices 145 that may implement or host network functions, such as for example, a user plane function (UPF), an access and mobility management function (AMF), a session management function (SMF), a unified data management (UDM) function, an authentication server function (AUSF), a network slice selection function (NSSF), and so forth. According to other exemplary implementations, provider network 140 may include additional, different, and/or fewer network devices than those described. For purposes of illustration and description, network devices 145 may include various types of network devices that may be resident in provider network 140, as described further herein.

External network 160 may include one or multiple networks. For example, external network 160 may be implemented to include a cloud network, a service or an application-layer network, the Internet, an Internet Protocol Multimedia Subsystem (IMS) network, a Rich Communication Service (RCS) network, a packet-switched network, or other type of network that hosts a user device application or service. According to an implementation, external network 160 may provide cloud compute services for a specific service provider (e.g., Amazon® Web Services (AWS), Microsoft Azure®, IBM IOT Bluemix®, etc.) network. Depending on the implementation, external network 160 may include various network devices 165 that provide various applications, services, or other type of user device assets, such as servers (e.g., web, application, cloud, etc.), mass storage devices, data center devices, and/or other types of network services pertaining to various network-related functions.

Developer device 175 may include a mobile device or a stationary computing device that is capable of communicating with other devices in network environment 100. In one implementation, Developer device 175 may provide an interface to obtain software development kit (SDK) and configurations for application programming interfaces (APIs) for use in developing applications (e.g., application 185) that can use the distributed GPU service.

End device 180 includes a device that has computational and wireless communication capabilities. End device 180 may be implemented as a mobile device, a portable device, a stationary device, a device operated by a user, or a device not operated by a user. For example, end device 180 may be implemented as a Mobile Broadband device, a smartphone, a computer, a tablet, a netbook, a wearable device, a vehicle support system, a game system, a drone, a virtual reality system, and augmented reality system, or some other type of wireless device. According to various exemplary embodiments, end device 180 may include or be connected to a video camera or other video/audio equipment. End device 180 may also be configured to execute various types of software (e.g., applications, programs, graphics processing, etc.). User device 180 may support one or multiple RATs (e.g., 4G, 5G, etc.), one or multiple frequency bands, network slicing, dual-connectivity, and so forth. Additionally, user device 180 may include one or multiple communication interfaces that provide one or multiple (e.g., simultaneous or non-simultaneous) connections via the same or different RATs, frequency bands, etc. As described further herein, user device 180 may download and/or register application 185. The application may be a customer application designed to use MEC compute resources, particularly MEC compute resources that provide the distributed GPU service. According to an implementation, developers may incorporate APIs in their applications to request access to the distributed GPU service operated in MEC network 130. The distributed GPU service may divide tasks (e.g., for application 185) between MEC clusters and end device 180.

Figure 2:
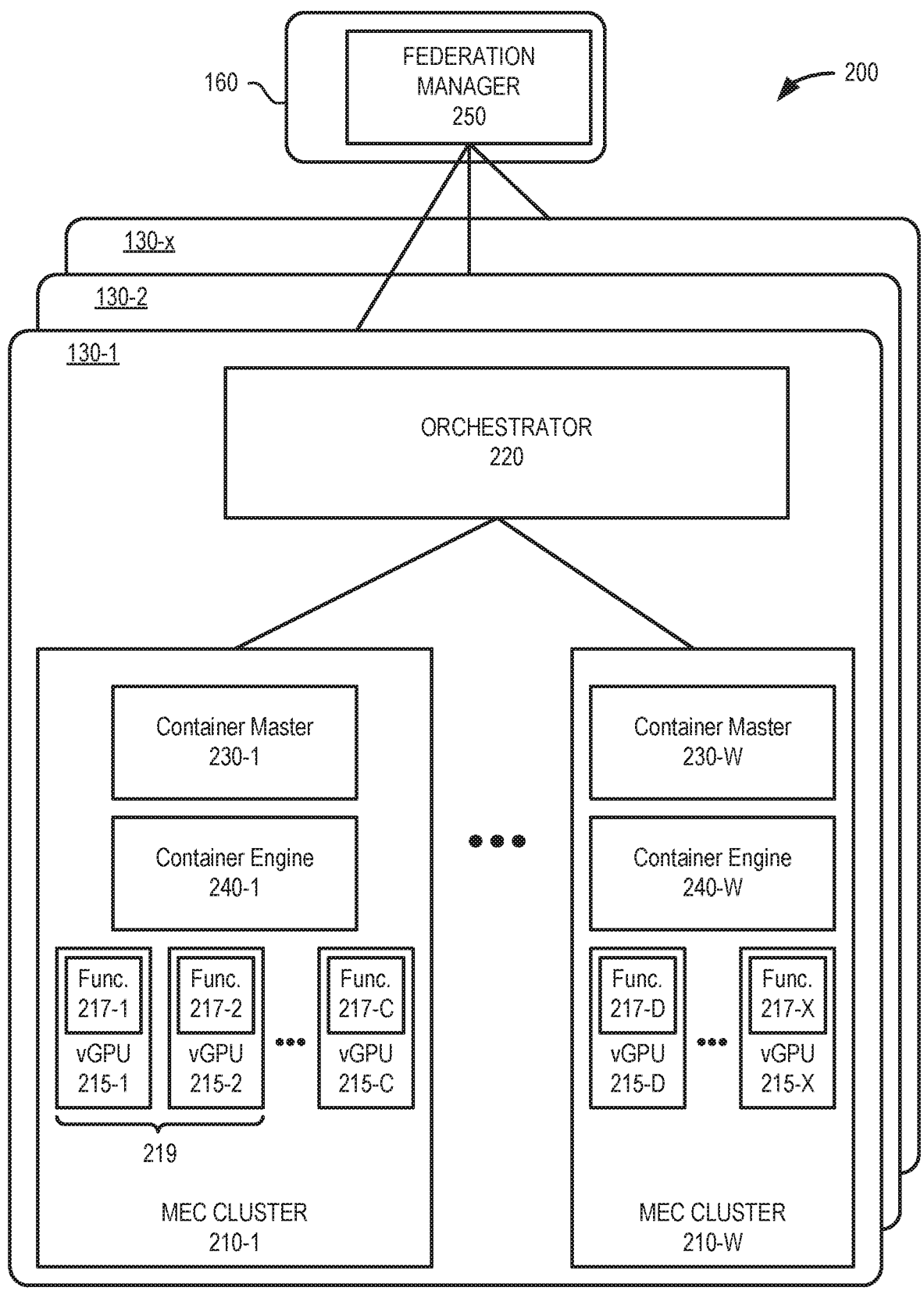
FIG. 2 is a block diagram illustrating exemplary components in a portion of the network environment of FIG. 1.

FIG. 2 is a block diagram of a portion 200 of network environment 100. As shown in FIG. 2, multiple local MEC network 130-1 through 130-$x$ (also referred individually or generally as MEC network 130) may communicate with a federation manager 250, which may be located within external network 160 or another external network, for example.

Network portion 200 illustrates exemplary components of each MEC network 130 that may implement the distributed GPU service described herein. As illustrated, MEC network 130 may include an orchestrator 220 and MEC clusters 210-1 through 210-W (also referred to as MEC clusters 210, and individually or generally as MEC cluster 210). Each of MEC clusters 210 may include virtual GPUs (vGPU) 215-1 through 215-X (also referred to as vGPUs 215, and individually or generally as vGPU 215), container masters 230-1 through 230-W (also referred to as container masters 230, and individually or generally as container master 230), and container engines 240-1 through 240-W (also referred to as container engines 240, and individually or generally as container engine 240). vGPUs 215 may include functions (Func.) 217-1 through 217-X (also referred to as functions 217, and individually or generally as function 217). Each of orchestrator 220, MEC clusters 210, and container master 230 may correspond to one or more MEC devices 135.

MEC cluster 210 may support one or multiple vGPUs 215 and functions 217 that provide distributed GPU services and/or micro-services (e.g., a task, a function, etc.), as described herein. The distributed GPU services may include graphics processing or other functions to support extreme real-time communications (e.g., tactile Internet, augmented reality (AR), virtual reality (VR), computer vision, etc.), ultra-reliable communications (e.g., automated traffic control and driving, collaborative robots, health-related services (e.g., monitoring, remote surgery, etc.), drone delivery, public safety, etc.), and/or other types of mobile edge application services.

According to an implementation, MEC network 130/MEC clusters 210 may be located at different geographic locations (e.g., network edges) to provide minimum latency for customers using local access networks 105/wireless stations 110. The number, type, and arrangement of MEC clusters 210 are exemplary. The number and arrangement of communication links illustrated are also exemplary. MEC network 130 may include additional and/or different MEC devices 135 in other exemplary embodiments. For example, MEC devices 135 may include additional and/or different system or management level MEC devices 135 that are not illustrated and described for the sake of brevity.

MEC clusters 210 may include network devices that support the virtualization of GPU services. MEC cluster 210 provides various physical resources (e.g., processors, memory, storage, communication interface, etc.), software resources (e.g., operating system, etc.) and other virtualization elements (e.g., hypervisor, container engine, etc.). vGPUs 215 may be implemented as containers, virtual machines (VMs), or another type of virtualization architecture that provides one or multiple GPU services for end devices 180. In still another implementation, vGPU 215 may be implemented as a virtual CPU or another type of high-efficiency compute device that can provide GPU functionality. According to one implementation, each vGPU 215 may perform a function 217.

Function 217 may include software or firmware for a GPU service. Multiple functions 217 may be grouped into a container for a particular type of service (e.g., that supports a customer application, such as application 185). Functions 217 may include one or multiple instances of the same or different services. Non-limiting examples of functions 217 may include object classification, feature-based recognition, feature matching, reflection mapping, light source detection, lightmap/shadow rendering, radiance/irradiance mapping, environment audio modeling, spatial audio calculations, etc. Groups of functions 217 may be compiled as containers 219 to perform services, such as a service to generate lighting data for rendering in XR applications.

Orchestrator 220 may include logic that manages the lifecycle of vGPUs 215 for a local MEC network (e.g., MEC network 130-1). According to an exemplary embodiment, orchestrator 220 may determine whether a vGPU 215 is instantiated, terminated, or is in another state based on usage data of a service or a micro service, as described herein. Orchestrator 220 may include logic that performs other types of operations, such as management of a service/microservice rules and requirements, resource management, and/or other system level management functions pertaining to MEC network 130.

According to an implementation, one or more container masters 230 may be included with or provided for each MEC cluster 210. Container master 230 may orchestrate use of container engine 240, directing container provisioning and initialization for new service requests. Container master 230 may manage a cluster of compute instances and schedule containers to run on a cluster 210 based on the available compute resources and the resource requirements of each container. Container master 230 may be implemented, for example, using Kubernetes or another container management program. Container engine 240 may generate containers used to perform a service for a customer application (e.g., application 185). For example, container engine 240 may provision containers 219 (e.g., groups of vGPUs 215 executing functions 217) for a group of parallel functions that are used simultaneously to provide rendering data for the customer applications. Container engine 240 may be implemented, for example, using Docker or another container management program.

Federation manager 250 may manage real-time allocation of shared MEC resources. Federation manager 250 may provide orchestration at a high level among multiple local MEC networks 130, with an end-to-end view of the infrastructure, network, and applications. For example, federation manager 250 may be a centralized component serving hundreds of edge locations (e.g., MEC networks 130-1, 130-2, etc.) with multiple clusters (e.g., MEC clusters 210) in each location.

Typically, maintaining continuous, dedicated MEC resources (e.g., vGPUs 215 or containers 219) for users of a particular application (e.g., application 185) throughout MEC network 130 is both cost-prohibitive to application providers and an inefficient use of limited MEC resources. Instead, federation manager 250 may include logic to optimize availability of resources within multiple MEC clusters 210. For example, vGPUs 215 at each MEC cluster 210 may be made available for use by customer applications with just-in-time launching of the GPU services. Developers (e.g., using developer devices) may provide application settings that define latency requirements, fallback settings, and other configurations for particular applications 185. Federation manager 250 may apply the application settings to real-time network data and network use projections to optimally allocate resources at each MEC cluster 210 and between MEC clusters 210.

Although FIG. 2 shows example components of a MEC network 130 with a single federation manager 250, in other implementations, MEC network 130 may contain fewer components, different components, differently-arranged components, or additional components than depicted in FIG. 2. Alternatively, or additionally, one or more components of MEC network 130 may perform one or more other tasks described as being performed by one or more other components of MEC network 130. For example, in another implementation, container master 230 and container engine 240 may be combined into a single logical component.

Figure 3:
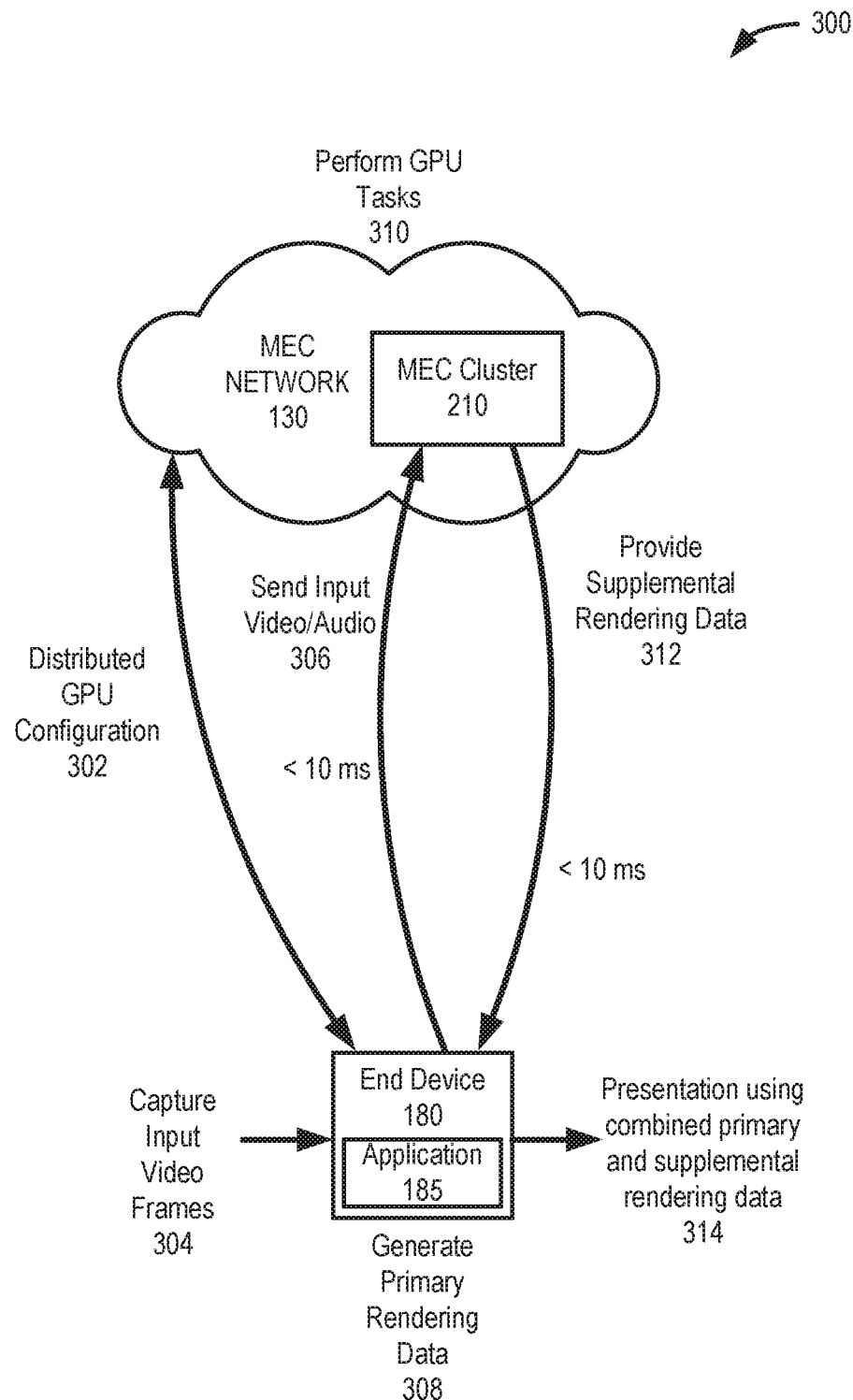
FIG. 3 is a diagram illustrating exemplary communications for the distributed GPU service in a portion of network environment of FIG. 1.

FIG. 3 illustrates exemplary communications for the distributed GPU service in a portion 300 of network environment 100. Network portion 300 may include MEC network 130 and end device 180.

As shown in FIG. 3, end device 180 may execute application 185, initiating distributed GPU configuration 302 for application 185. MEC network 130 may configure one or more MEC devices 135 to provide the distributed GPU service for the particular instance of application 185 on end device 180. The distributed GPU configuration 302 may include, for example, identifying the requested GPU services; determining a location (e.g., a point of attachment, such as wireless station 110) of end device 180 to select a nearest MEC cluster; determining what hardware (e.g., MEC devices 135) are available to provide services at the MEC cluster; assigning IP addresses; assigning or instantiating a network slice for the end device to access a container 219 in MEC cluster 210 that provides the required service; and/or scaling the system up or down for the current number of users. MEC network 130 may forward the IP address to end device 180 to use in obtaining GPU services.

Once configured and authorized, end device 180 may capture input video frames 304 for application 185. For example, application 185 may include a gaming or XR application that collects or receives a video stream. Application 185 may be configured to implement the distributed GPU service. For example, using API calls, application 185 may send the input audio and/or video 306 to the assigned container 219 in MEC cluster 210. At the same time, end device 180 may generate primary rendering data 308. Primary rendering data may include, for example, object tracking, AR object rendering, model rendering, etc. According to one implementation, primary rendering may be sufficient to provide a graceful fallback for application 185 if a network connection with MEC network 130 is interrupted.

The vGPUs 215 in container 219 may receive the input audio and/or video 306 and may perform GPU tasks 310 in accordance with the parameters configured for application 185. For example, vGPU may use the input audio and/or video 306 to calculate lighting, spatial rendering for immersive audio, perform computer vision, etc. Output from vGPU 215 may be provided to end device 180 as supplemental rendering data 312. For example, vGPU 215 may output lighting or shadow data on a frame-by-frame basis.

End device 180 may receive the supplemental rendering data and combine the supplemental rendering data with the primary rendering data to provide a presentation using the combined data 314. For example, end device 180 may receive lighting data from vGPU to combine with a VR object for presentation on a frame by frame basis. MEC network 130 may provide real-time (e.g., about 30 ms or less) data to support combination with primary rendering data generated locally at end device 180.

Figure 4:
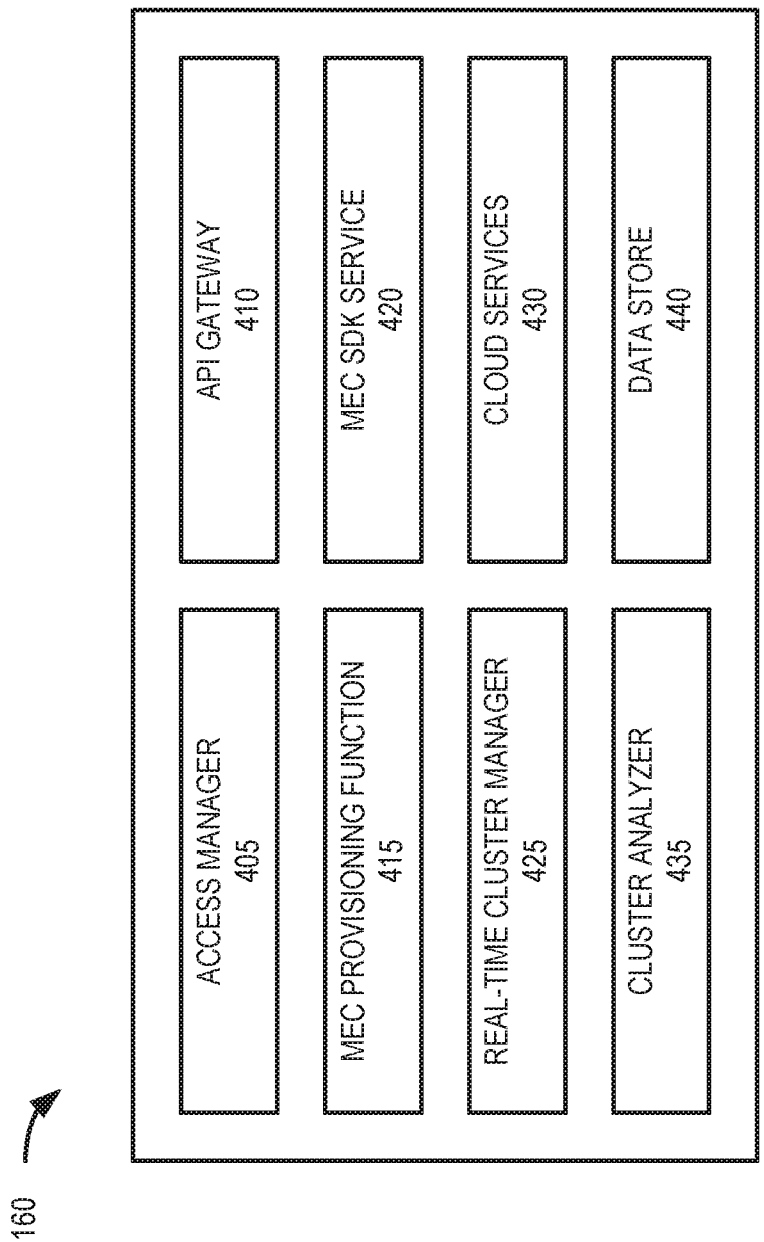
FIG. 4 is a block diagram illustrating logical components of the external network of FIG. 1.

FIG. 4 is a block diagram illustrating logical components of external network 160. The logical components of external network 160 may be implemented, for example, by network devices 165 or as a virtual machine or virtual function executed on a network device 165. In another implementation, some or all of the logical components of FIG. 4 may be included within federation manager 250 of external network 160. As shown in FIG. 4, external network 160 may include an access manager 405, an API gateway 410, a MEC provisioning function 415, a MEC software development kit (SDK) service 420, a real-time cluster manager 425, cloud services 430, a cluster analyzer 435, and a data store 440.

Access manager 405 may include an identity and access management function. In one implementation, access manager 405 may allow a customer to set policies, criteria and/or preferences with respect to allowing end devices 180 and/or applications 185 to access MEC services. Access manager 405 may also provide these end devices/applications with access to MEC services based on the policy, criteria and/or preference information. In some instances access manager 405 may use security tokens to enforce access restrictions.

API gateway 410 may generally manage the receipt and initial routing of MEC service requests, developer service requests, or other requests. API gateway 410 may direct requests to other logical components of external network 160.

MEC provisioning function 415 may provide configuration/provisioning for MEC clusters 210 to provide distributed GPU services for customer applications. As described further herein, MEC provisioning function 415 may use a virtualization technology for provisioning of vGPUs. For example, the virtualization of a MEC device 135 may be implemented based on a virtual container or a vGPU along with other virtualization technology/architecture, such as a hypervisor, a container engine, and underlying hardware resources of the network device (e.g., a host device). The virtualization technology and/or architecture support the creation, deletion, and intermediary operational state (also known as the "lifecycle") of the virtual network device and instance of the application service. MEC provisioning function 415 may detect hardware configurations at each cluster, including, for example, the number of context switches available to support multiple vGPU services, etc.

MEC SDK service 420 may provide software modules, templates, services, and the like for developers to create applications that can utilize the distributed GPU service. MEC SDK service 420 may include, for example, service node health monitors, kernel analyzers, log analyzers, memory analyzer, input/output (I/O) usage monitors, vulnerability detectors, sizing calculators, support helpers, platform sizing tools, statistics gathering tools, configuration management tools, etc. According to one implementation, MEC SDK service 420 may include a software development kit for use by developers to create or modify applications to utilize distributed GPU services. For example, MEC SDK service 420 may include software templates, scripts, and test platforms that may be used by network administrators and/or programmers to implement specific distributed GPU services.

Real-time cluster manager 425 may direct use of resources in MEC networks 130 based on their current conditions. Real-time cluster manager 425 may receive a continuous stream of cluster utilization data from MEC clusters 210 and/or orchestrator 220. The received data may include "request data," such as, for example, records of service requests, service terminations, and other requests (e.g., http requests) from end devices 180/applications 185 at any of MEC networks 130. Real-time cluster manager 425 may apply network traffic models to the request data, determine real-time conditions of MEC resources, and assign incoming requests to available MEC clusters.

Cloud services 430 may include other cloud-bases services that may indirectly relate to providing the distributed GPU service. For example, cloud services 430 may include training modules, cloud-based metrics and/or benchmarks, billing-related functions, etc. that may support administration and off-line functions for the distributed GPU service.

Cluster analyzer 435 may process stored MEC cluster data. According to one implementation, cluster analyzer 435 may include a machine-learning module to analyze network impact of an application 185 over time. Cluster analyzer 435 may observe various internal and external system data related to different customer applications 185, such as load balancing, latency, performance monitoring, etc., and automatically generate models for handling incoming MEC service requests in a manner that optimizes allocation of MEC cluster 210 resources. In one implementation, cluster analyzer may evaluate and update models periodically (e.g., every several minutes, hourly, daily, etc.)

Data store 440 may store usage data from MEC clusters 210. Data store 440 may include a database or another type of data storage (e.g., a table, a list, a flat file, etc.). MEC data from data store 440 may be used by cluster analyzer 435.

FIG. 4 shows exemplary logical components of external network 160. In other implementations, external network 160 may include fewer, more, or different logical components, and all external networks 160 may not include an identical set of logical components.

Figure 5:
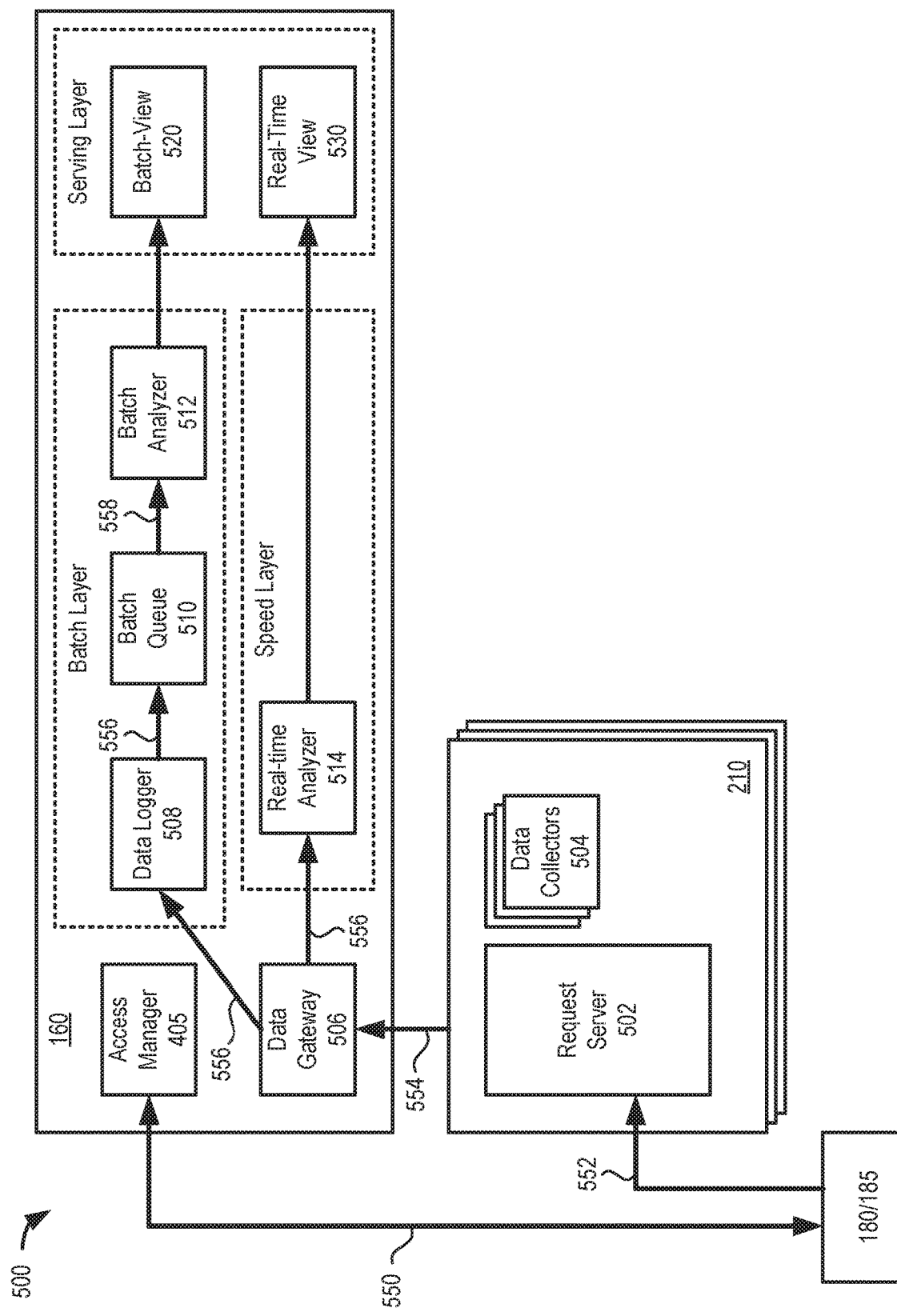
FIG. 5 is a block diagram of a distributed GPU provisioning framework in a portion of the network environment FIG. 1.

FIG. 5 is a block diagram of a distributed GPU provisioning framework in a portion 500 of network environment 100 according to another embodiment. GPU framework 500 may facilitate assignment of MEC 210 resources to instantiate, maintain, or tear down resource assignments. In the example of FIG. 5, MEC cluster 210 may include a request server 502 and data collectors 504. External network 160 may include access manager 405, data gateway 506, data logger 508, batch queue 510, batch analyzer 512, and a real-time analyzer 514.

As shown in FIG. 5, an end device 180 executing application 185 may conduct an authentication exchange 550 with access manager 405. Exchange 550 may direct application 185 to an applicable MEC cluster 210 for providing distributed GPU services to application 185.

After being assigned to an MEC cluster 210, application 185 may submit a service request 552 to MEC cluster 210 for a particular distributed GPU service, such as supplemental GPU services for rendering, lighting, spatial audio, vision, etc. In one implementation, service request 552 may be received by a request server 502 in MEC cluster 210. Request server 502 may include, for example, a JavaScript server that manages incoming requests to MEC clusters 210 from end devices 180. MEC cluster 210 may collect the incoming request and other usage data from data collectors 504. Data collected by data collectors 504 may include, for example, usage data at individual GPUs within MEC cluster 210. In one implementation, data collectors 504 may include a graphics processing unit for general purpose processing. Data from the service requests 552 and other usage data from data collectors 504 (collectively referred to as local utilization data 554) may be forwarded in real-time to MEC resource management systems in external network 160.

A data gateway 506 in external network 160 may receive local utilization data 554 from MEC cluster 210 (and other MEC clusters 210 in the same or other MEC networks 130). Data gateway 506 may include, for example, a distributed streaming platform for building real-time streaming data pipelines to other components in external network 160. Data gateway 506 may forward local utilization data 554, along with utilization data from other MEC clusters 210, as log data 556. Log data 556 may be forwarded as separate, redundant streams into a speed layer and a batch layer.

In the batch layer, a data logger 508 may receive log data 556. Data logger 556 may collect, aggregate, and forward log data to a batch queue 510. Batch queue 510 may hold sections of log data 556 from multiple MEC clusters 210 for retrieval by a batch analyzer 512. Batch analyzer 512 may analyze data from batch queue 510. For example, batch analyzer 512 may retrieve batch data 558 and generate an overview of a list of resources available in each of MEC clusters 210. Batch analyzer 512 may generate a batch view 520 that may be used in a serving layer of external network 160 to select MEC clusters for future service requests from applications 185. The batch view may, for example, provide historical context for a mobility-related handover involving different MEC networks 130.

In the speed layer, data gateway 506 may forward log data 556 to a real-time analyzer 514. Real-time analyzer 514 may perform real-time processing to evaluate cluster utilization (e.g., real-time conditions) for particular MEC clusters 210. Real-time analyzer 514 may generate a real-time view 530 that may be used in the serving layer of external network 160. Real-time view 530 may provide an updated status of available MEC resources based on the known hardware capacities, the projected utilization (e.g., based on modelling), and the current utilization of each cluster.

Figure 6:
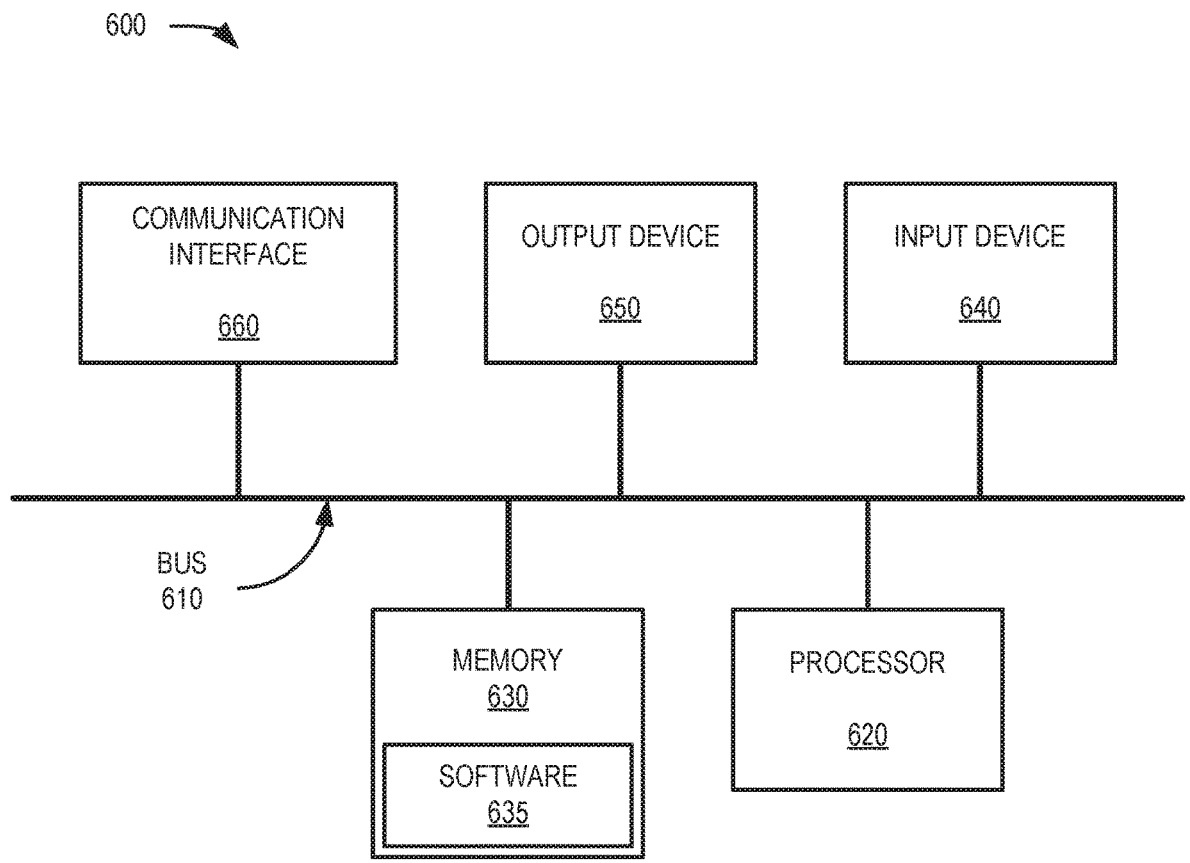
FIG. 6 is a block diagram illustrating exemplary components of a device that may correspond to one of the devices of FIGS. 1-5.

FIG. 6 is a block diagram illustrating exemplary components of a device that may correspond to one of the devices of FIGS. 1-5. Each of MEC device 135, network device 145, network devices 165, developer device 175, and user device 180 may be implemented as a combination of hardware and software on one or more of device 600. As shown in FIG. 6, device 600 may include a bus 610, a processor 620, a memory 630, an input component 640, an output component 650, and a communication interface 660.

Bus 610 may include a path that permits communication among the components of device 600. Processor 620 may include a processor, a microprocessor, or processing logic that may interpret and execute instructions. Memory 630 may include any type of dynamic storage device that may store information and instructions, for execution by processor 620, and/or any type of non-volatile storage device that may store information for use by processor 620.

Software 635 includes an application or a program that provides a function and/or a process. Software 635 is also intended to include firmware, middleware, microcode, hardware description language (HDL), and/or other form of instruction. By way of example, when device 600 is a user device 180, software 635 may include application 185 that uses MEC services.

Input component 640 may include a mechanism that permits a user to input information to device 600, such as a keyboard, a keypad, a button, a switch, touch screen, etc. Output component 650 may include a mechanism that outputs information to the user, such as a display, a speaker, one or more light emitting diodes (LEDs), etc.

Communication interface 660 may include a transceiver that enables device 600 to communicate with other devices and/or systems via wireless communications, wired communications, or a combination of wireless and wired communications. For example, communication interface 660 may include mechanisms for communicating with another device or system via a network. Communication interface 660 may include an antenna assembly for transmission and/or reception of RF signals. For example, communication interface 660 may include one or more antennas to transmit and/or receive RF signals over the air. In one implementation, for example, communication interface 660 may communicate with a network and/or devices connected to a network. Alternatively or additionally, communication interface 660 may be a logical component that includes input and output ports, input and output systems, and/or other input and output components that facilitate the transmission of data to other devices.

Device 600 may perform certain operations in response to processor 620 executing software instructions (e.g., software 635) contained in a computer-readable medium, such as memory 630. A computer-readable medium may be defined as a non-transitory memory device. A non-transitory memory device may include memory space within a single physical memory device or spread across multiple physical memory devices. The software instructions may be read into memory 630 from another computer-readable medium or from another device. The software instructions contained in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

Device 600 may include fewer components, additional components, different components, and/or differently arranged components than those illustrated in FIG. 6. As an example, in some implementations, a display may not be included in device 600. As another example, device 600 may include one or more switch fabrics instead of, or in addition to, bus 610. Additionally, or alternatively, one or more components of device 600 may perform one or more tasks described as being performed by one or more other components of device 600.

Figure 7:
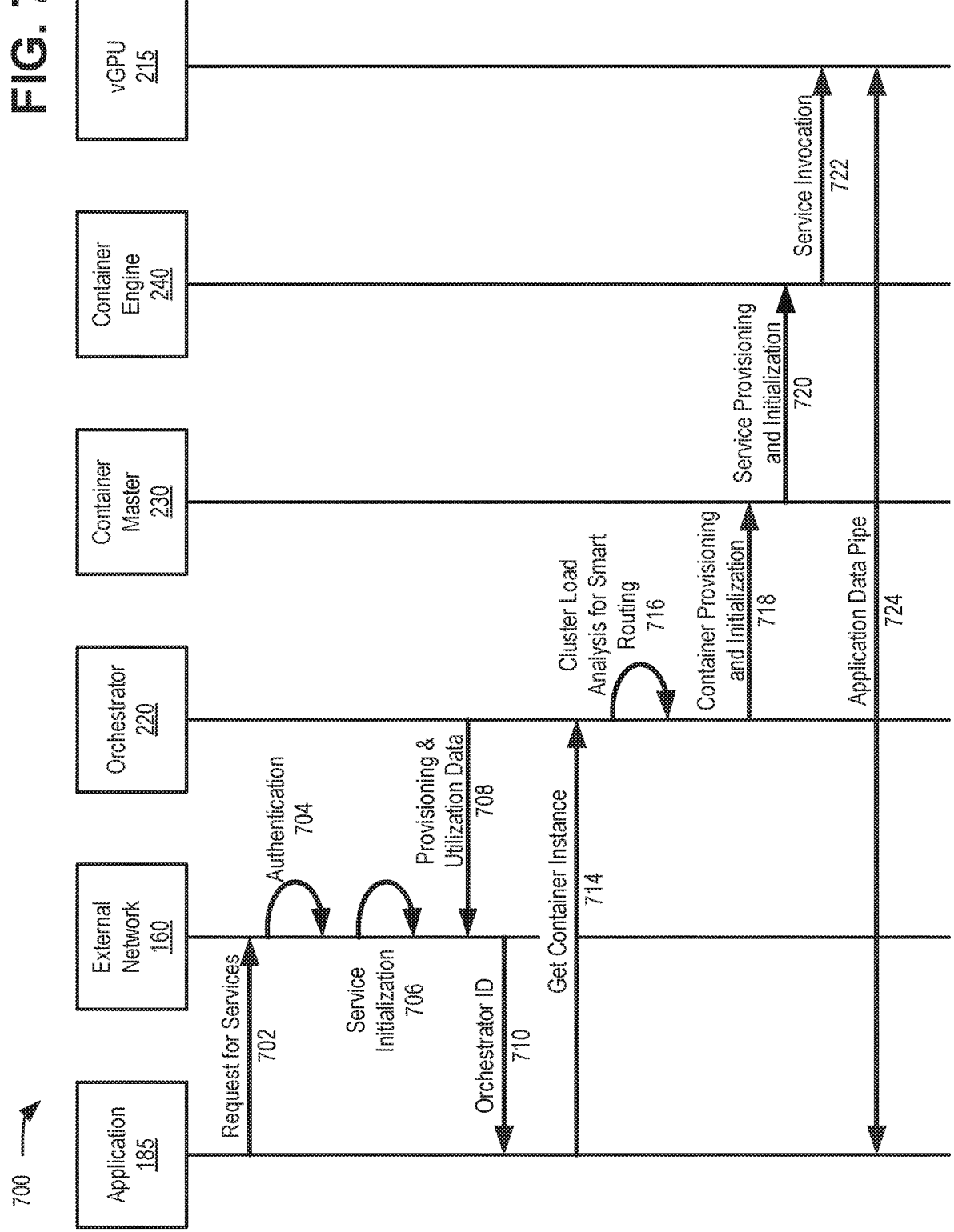
FIG. 7 is a diagram illustrating exemplary communications for provisioning a distributed GPU service in a portion of the network environment of FIG. 1.

FIG. 7 is a diagram illustrating exemplary communications for provisioning a distributed GPU service in a portion 700 of network environment 100. FIG. 7 provides simplified illustrations of communications in network portion 700 and is not intended to reflect every signal or communication exchanged between devices.

As shown in FIG. 7, application 185 (e.g., executed on end device 180) may send a request for services 702 to external network 160. For example, a user of end device 180 may launch application 185, which may cause application 185 to request MEC-based support services for XR from a preconfigured cloud platform in external network 160. The request for services may include, for example, latency requirements for providing the application service. External network 160 may perform an authentication procedure 704 (e.g., authentication exchange 550 using access manager 405) for application 185. Assuming successful authentication, external network 160 may initialize 706 provisioning for the requested MEC services.

MEC orchestrator 220 (along with other MEC orchestrators 220, not shown) may continuously send provisioning and utilization data 708 to external network 160 (e.g., federation manager 250). Provisioning and utilization data 708 may include, for example, local utilization data 554 described above. External network 160 may generate a real-time cluster view (e.g., real-time view 530) and select a MEC network 130 with a location (e.g., a latency-impacting distance) and available cluster resources to support the service request. For example, according to one implementation, external network 160 may identify, based on a location of end device 180, a MEC network 130 (e.g., with one or more available clusters 210) that is sufficiently close geographically to meet the latency requirements for application 185 (e.g., latency requirements as indicated in the request for services 702).

Based on selection of an MEC network 130, external network 160 (e.g., federation manager 250) may provide a corresponding orchestrator identifier (ID) 710 to application 185. In one implementation, external network 160 may provide orchestrator ID 710 in response to request 702, while in other implementations, application 185 may submit an additional request. The orchestrator ID may correspond to an orchestrator 220 for the selected MEC network 130, which may include multiple MEC clusters 210. Using orchestrator ID 710, application 185 may send a get container instance request 714 to orchestrator 220.

Orchestrator 220 may receive get container instance request 714 and, in response, perform a cluster load analysis for smart routing of the service request, as indicated at reference 716. For example, container master 230 may identify resources within cluster 210 that may support the application requirements for application 185. Orchestrator 220 may send container provisioning and initialization request 718 to container master 230.

Container master 230 may receive container provisioning and initialization request 718 and may initialize one or more containers (e.g., containers 219) with virtual GPUs. Container master 230 may send service provisioning and initialization request 720 to container engine 240 to meet the particular service request for application 185. Container engine 240 may receive service provisioning and initialization request 720 and may provision containers 219 (e.g., groups of vGPUs 215 executing functions 217) for a group of parallel functions, for example, to service application 185. Container engine 240 may provide a service invocation 722 to one or more vGPUs 215. MEC network 130 may forward IP addresses to application 185 to use in obtaining the GPU services and establishing an application data pipe 724 for the requested MEC-based support services. For example, external network 160 may provide an IP address for the provisioned container 219 in MEC cluster 210 to application 185, and application 185 may begin sending data (e.g., video/audio input 306) to the container 219 in MEC cluster 210 and container 219 may provide supplemental rendering data 312 to application 185.

Figure 8:
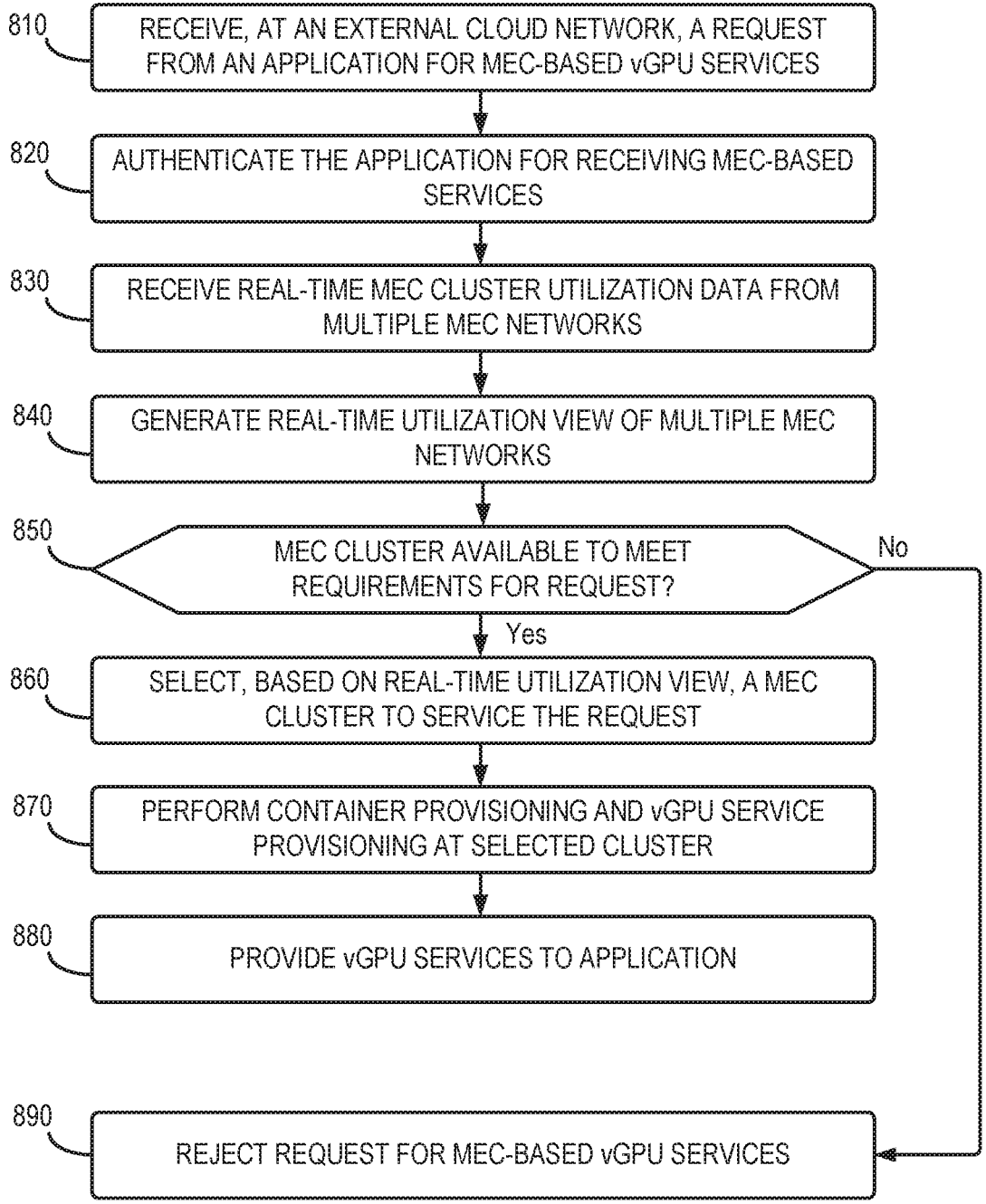
FIG. 8 is a flow diagrams illustrating exemplary processes for provisioning a distributed GPU service, according to an implementation described herein.

FIG. 8 is a flow diagram illustrating an exemplary process 800 for provisioning distributed GPU services. In one implementation, process 800 may be performed by external network 160. In another implementation, process 800 may be performed by external network 160 in conjunction with one or more other network devices in a local MEC network 120.

Process 800 may include receiving, at an external cloud network, a request from an application for MEC-based vGPU services (block 810), and authenticating the application for receiving the MEC-based services (block 820). For example, an application 185 executed on end device 180 may be directed to access manager 405, an application server, or another network device 165 in external network 160. External network 160 may authenticate the user, application, or end device to access distributed GPU services on the MEC platform.

Process 800 may further include receiving real-time MEC cluster utilization data from multiple local MEC networks (block 830), and generating a real-time utilization view of the multiple MEC networks (block 840). For example, each local MEC network 130 in network environment 100 may provide a stream of utilization data to external network 160. As described, for example, in connection with FIG. 5, the external network may apply real-time analytics and machine learning to data batches to generate a real-time view, as well as a batch view, of MEC network utilization.

Process 800 may also include determining if a MEC cluster is available to meet requirements for the service request (block 850). For example, based on latency and other requirements for application 185 (e.g., as included in a request for services) and a real-time view of clusters in local MEC networks 130, external network 160 may identify a cluster that is available to provide distributed GPU services to application 185. In one implementation, external network 160 may first determine a subset of available clusters based on the location (e.g., connection to a wireless access point 110) of the end device 180 that is executing application 185 and expected latency to the local MEC networks.

If a MEC cluster is available to meet requirements for the service request (block 850—Yes), process 800 may include selecting, based on the real-time utilization view, a MEC cluster to service the request (block 860). For example, external network 160 may select a MEC network location (e.g., MEC network 130) that includes a MEC cluster 210 with available resources to service the request from application 185. External network 160 may direct application 185 to the orchestrator 220 for the selected MEC network 130. Orchestrator 220 may select a MEC cluster 210 with available resources to service the request from application 185.

Process 800 may additionally include performing container provisioning and vGPU service provisioning at selected cluster (block 870) and providing vGPU services to the application (block 880). For example, external network 160 may send a get container instance request 710 to the orchestrator 220 for the selected MEC cluster 210. Orchestrator 220 may receive get container instance request 710 and identify resources within cluster 210 that may support application requirements. Orchestrator 220 may send container provisioning and initialization request 714 to container master 230, which may send service provisioning and initialization request 716 to container engine 240 to meet the particular service request for application 185.

If a MEC cluster is not available to meet requirements for the service request (block 850—Yes), process 800 may include rejecting the request for MEC-based vGPU services (block 890). For example, external network 160 may reject the services request from application 185 and may application 185 may gracefully fall back to non-MEC-based services.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 620, etc.), or a combination of hardware and software (e.g., software 635).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 620) of a device. A non-transitory storage medium includes one or more of the storage mediums described in relation to memory 630.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method, comprising:
   receiving, by one or more network devices in a network, a service request from an application, wherein the service request is for multi-access edge compute (MEC)-based virtual graphic processing unit (vGPU) services;
   receiving, by the one or more network devices, real-time utilization data from multiple MEC clusters in different MEC network locations;
   forwarding, via real-time data pipelines, separate, redundant streams of the real-time utilization data, wherein a first stream of the redundant streams is directed to a batch layer that aggregates the real-time utilization data for historical context, and wherein a second stream of the redundant streams is directed to a speed layer that analyzes real-time conditions;
   generating, by the one or more network devices, a utilization view of the multiple MEC clusters in the different MEC network locations, wherein the utilization view is based on processing of the separate, redundant streams;
   selecting, by the one or more network devices and based on the utilization view, one of the different MEC network locations to provide the MEC-based vGPU services; and
   instructing, by the one or more network devices, a MEC cluster of the multiple MEC clusters in the one of the different MEC network locations to perform container provisioning and service provisioning for the MEC-based vGPU services.

2. The method of claim 1, wherein the service request is generated by an application configured to implement distributed graphic processing unit (GPU) services that supplement a local GPU of an end device with a vGPU in the MEC cluster.

3. The method of claim 1, further comprising:
   authenticating, by the one or more network devices, the application to receive the MEC-based vGPU services.

4. The method of claim 1, wherein receiving the real-time utilization data includes receiving a portion of the real-time utilization data from each of the different MEC network locations via a real-time streaming data pipeline.

5. The method of claim 1, wherein generating the utilization view comprises providing a status of available MEC resources based on hardware capacities at each MEC cluster, a projected MEC cluster utilization, and a current utilization level of each MEC cluster.

6. The method of claim 5, wherein the hardware capacities include a number of context switches for each MEC cluster.

7. The method of claim 1, wherein selecting one of the different MEC network locations includes identifying one or more available MEC clusters from a subset of the multiple MEC clusters, wherein each MEC cluster of the subset of the multiple MEC clusters has sufficient geographic proximity to an end device executing the application to meet a latency requirement for the application.

8. The method of claim 1, wherein the service request includes a latency requirement for the application of less than about 20 milliseconds.

9. The method of claim 1, wherein generating the utilization view of the multiple MEC clusters includes applying machine learning to a batch of the real-time utilization data to predict utilization trends.

10. One or more network devices in a network, the one or more network devices comprising:
   a communications interface;
   a memory to store instructions; and
   one or more processors, wherein the one or more processors execute the instructions to:
      receive a service request from an application, wherein the service request is for multi-access edge compute (MEC)-based virtual graphic processing unit (vGPU) services;
      receive real-time utilization data from multiple MEC clusters in different MEC network locations;
      forward, via real-time data pipelines, separate, redundant streams of the real-time utilization data, wherein a first stream of the redundant streams is directed to a batch layer that aggregates the real-time utilization data for historical context, and wherein a second stream of the redundant streams is directed to a speed layer that analyzes real-time conditions;
      generate a utilization view of the multiple MEC clusters in the different MEC network locations, wherein the utilization view is based on processing of the separate, redundant streams;
      select, based on the utilization view, one of the different MEC network locations to provide the MEC-based vGPU services; and
      instruct a MEC cluster of the multiple MEC clusters in the one of the different MEC network locations to perform container provisioning and service provisioning for the MEC-based vGPU services.

11. The one or more network device of claim 10, wherein the service request is generated by an application configured to implement distributed graphic processing unit (GPU) services that supplement a local GPU of an end device with a vGPU in the MEC cluster.

12. The one or more network device of claim 10, wherein the one or more processors further execute the instructions to:
   authenticate the application to receive the MEC-based vGPU services.

13. The one or more network device of claim 10, wherein, when receiving the real-time utilization data, the one or more processors further execute the instructions to:
   receive a portion of the utilization data from each of the different MEC network locations via a real-time streaming data pipeline.

14. The one or more network device of claim 10, wherein, when generating the utilization view of the multiple MEC clusters, the one or more processors further execute the instructions to:
   apply machine learning to a batch of the real-time utilization data to predict utilization trends.

15. The one or more network device of claim 10, wherein, when generating the utilization view, the one or more processors further execute the instructions to:
   provide a status of available MEC resources based on hardware capacities at each MEC cluster, a projected MEC cluster utilization, and a current utilization level of each MEC cluster.

16. The one or more network device of claim 10, wherein, when selecting the one of the different MEC network locations, the one or more processors further execute the instructions to:
   select the MEC cluster from a subset of the multiple MEC clusters, wherein each MEC cluster of the subset of the multiple MEC clusters has sufficient geographic proximity to an end device executing the application to meet a latency requirement for the application.

17. The one or more network device of claim 10, wherein, when selecting one of the different MEC network locations, the one or more processors further execute the instructions to identify one or more available MEC clusters from a subset of the multiple MEC clusters, wherein each MEC cluster of the subset of the multiple MEC clusters has sufficient geographic proximity to an end device executing the application to meet a latency requirement for the application.

18. A non-transitory computer-readable storage medium storing instructions executable by a processor of a device in a network, which when executed cause the device to:
   receive a service request from an application, wherein the service request is for multi-access edge compute (MEC)-based virtual graphic processing unit (vGPU) services;
   receive real-time utilization data from multiple MEC clusters in different MEC network locations;
   forward, via real-time data pipelines, separate, redundant streams of the real-time utilization data, wherein a first stream of the redundant streams is directed to a batch layer that aggregates the real-time utilization data for historical context, and wherein a second stream of the redundant streams is directed to a speed layer that analyzes real-time conditions;
   generate a utilization view of the multiple MEC clusters in the different MEC network locations, wherein the utilization view is based on processing of the separate, redundant streams;
   select, based on the utilization view, one of the different MEC network locations, to provide the MEC-based vGPU services; and
   instruct a MEC cluster of the multiple MEC clusters in the one of the different MEC network locations to perform container provisioning and service provisioning for the MEC-based vGPU services.

19. The non-transitory computer-readable storage medium of claim 18, wherein the service request includes a request to supplement a local GPU of an end device with a vGPU in the MEC cluster.

20. The non-transitory computer-readable storage medium of claim 18, wherein the instructions to receiving the real-time utilization data further comprising instructions to:
   receive a portion of the utilization data from each of the different MEC network locations as real-time streaming data, combine the real-time streaming data, and forward the combined real-time streaming data in the data pipelines.

* * * * *